(12) United States Patent
Dallal et al.

(10) Patent No.: US 12,333,672 B2
(45) Date of Patent: Jun. 17, 2025

(54) SPLIT PROCESSING XR USING HIERARCHICAL MODULATION

(71) Applicant: QUALCOMM Incorporated, San Diego, CA (US)

(72) Inventors: Yehonatan Dallal, Kfar Saba (IL); Guy Wolf, Rosh Haayin (IL); Shay Landis, Hod Hasharon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 18/189,105

(22) Filed: Mar. 23, 2023

(65) Prior Publication Data

US 2024/0320785 A1    Sep. 26, 2024

(51) Int. Cl.
*G06F 3/01*    (2006.01)
*G06T 3/40*    (2006.01)
*G06T 9/00*    (2006.01)

(52) U.S. Cl.
CPC .............. *G06T 3/40* (2013.01); *G06F 3/013* (2013.01); *G06T 9/00* (2013.01)

(58) Field of Classification Search
None
See application file for complete search history.

(56) References Cited

U.S. PATENT DOCUMENTS

| | | | | |
|---|---|---|---|---|
| 2010/0259627 A1* | 10/2010 | Trumbull | ............. | H04N 23/951 |
| | | | | 348/208.4 |
| 2014/0184475 A1* | 7/2014 | Tantos | ........... | H04N 21/234318 |
| | | | | 345/8 |
| 2017/0123492 A1* | 5/2017 | Marggraff | ........... | G06F 3/04845 |
| 2019/0347845 A1* | 11/2019 | Makar | ..................... | G06T 15/80 |
| 2022/0078396 A1* | 3/2022 | Gül | ................. | H04N 21/41407 |
| 2023/0127471 A1* | 4/2023 | Sanders | ............. | H04N 21/4436 |
| | | | | 725/12 |
| 2023/0232103 A1* | 7/2023 | Kobayashi | ........... | H04N 13/344 |
| | | | | 348/158 |
| 2023/0325977 A1* | 10/2023 | Motilla | ................. | G06T 3/4053 |
| | | | | 382/299 |

* cited by examiner

*Primary Examiner* — Joni Hsu
(74) *Attorney, Agent, or Firm* — ArentFox Schiff LLP

(57) ABSTRACT

Aspects are provided including one or more techniques for graphics processing involving hierarchical modulation and foveated rendering. A first wireless device obtains, from a network entity, a hierarchical modulated image including higher and lower priority bits. The first wireless device also obtains gaze information from a second wireless device indicating an associated foveal region. In response to the gaze information, the first wireless device processes a portion of the hierarchical modulated image associated with the lower priority bits using the gaze information. For example, the device decodes low priority bits in the hierarchical modulated image in regions closer to the fovea. The first wireless device subsequently provides an image including the processed portion to be rendered at the second wireless device. For example, the processed image may have a higher resolution in the regions closer to the fovea but a lower resolution in regions farther from the fovea.

20 Claims, 10 Drawing Sheets

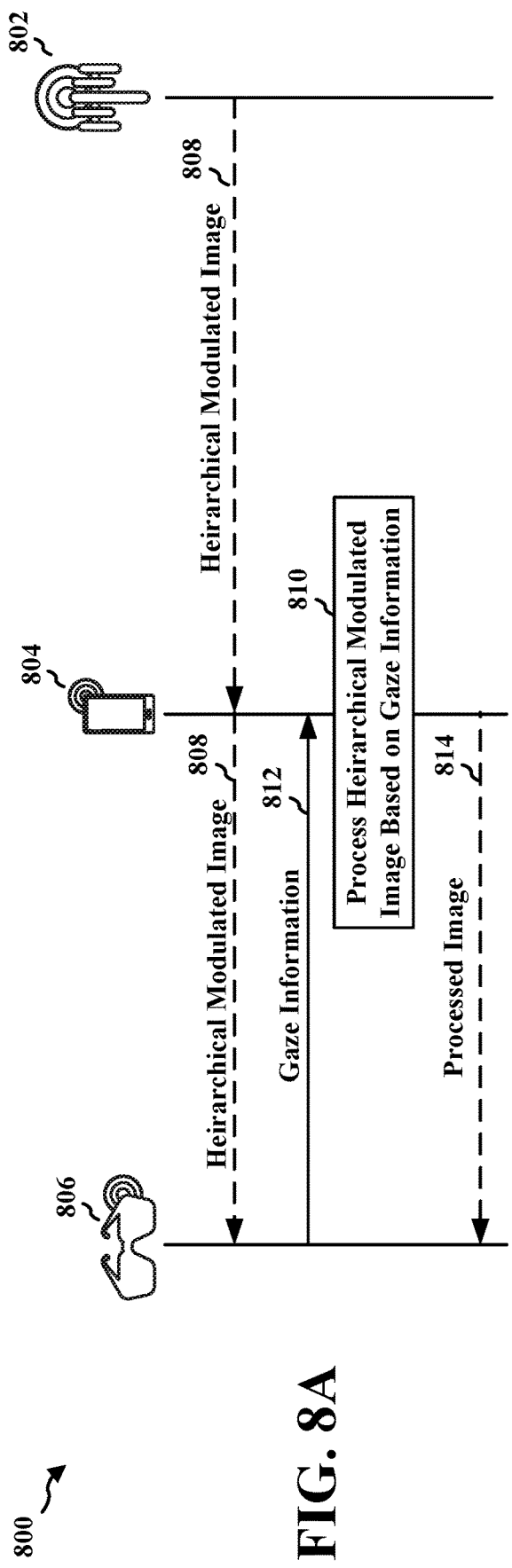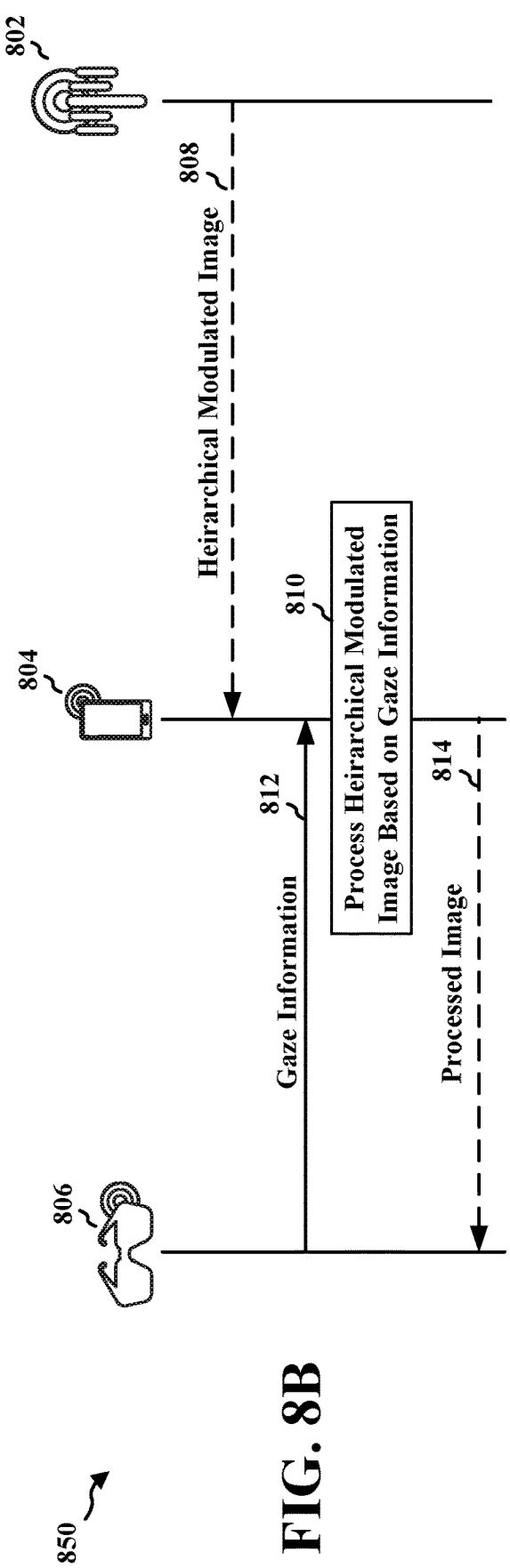

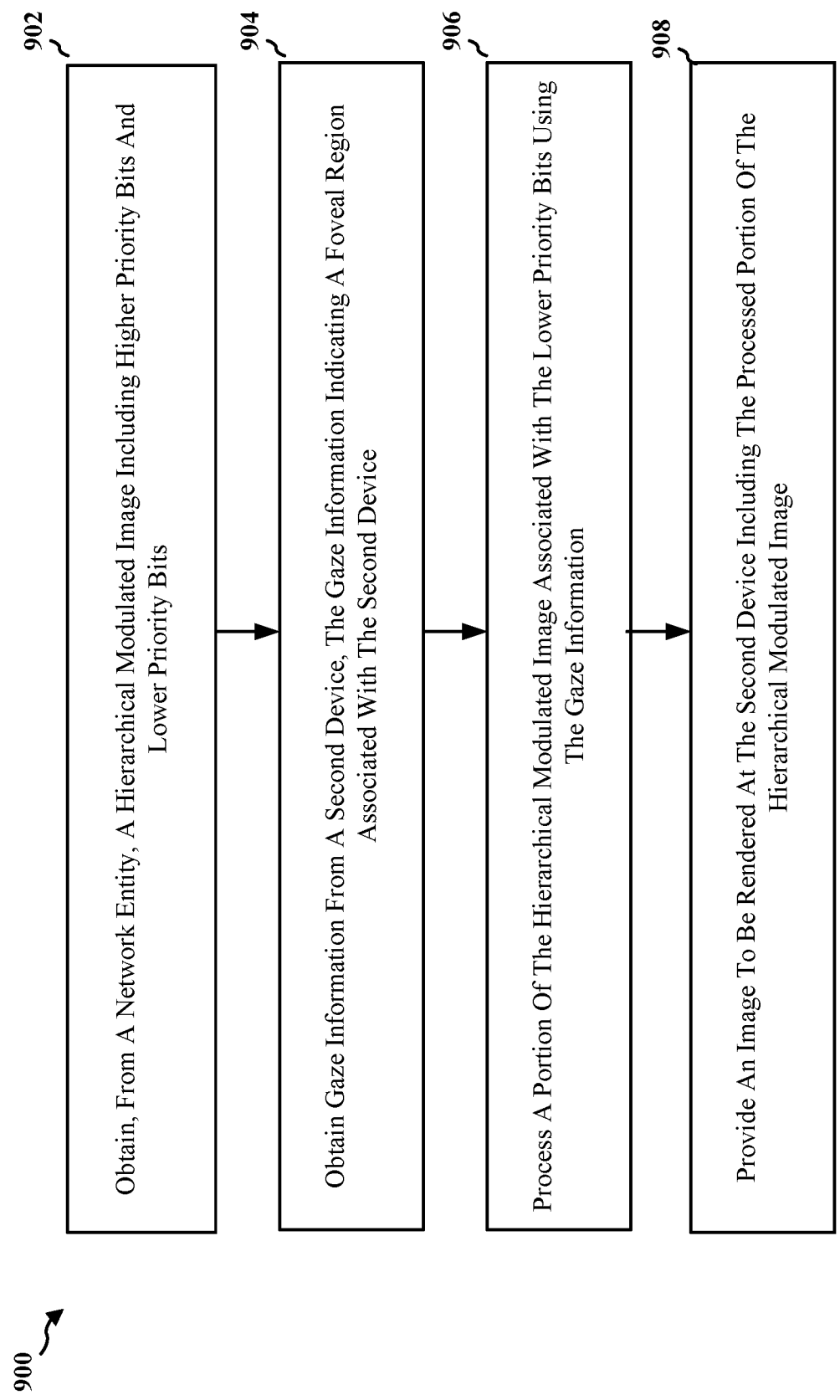

SPLIT PROCESSING XR USING HIERARCHICAL MODULATION

TECHNICAL FIELD

The present disclosure relates generally to communication systems, and, more particularly, to a wireless communication system incorporating one or more techniques for graphics processing involving hierarchical modulation and foveated rendering in a split or hybrid processing system.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Moreover, wireless computing devices often utilize a graphics processing unit (GPU) or central processing unit (CPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A CPU may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to present graphics content on a display. For example, the GPU of a head mounted display (HMD) may execute an extended reality (XR) program, such as a virtual reality (VR) program, an augmented reality (AR) program, or a mixed reality (MR) program, and present graphical content of the XR program on one or more displays of the HMD. However, given XR's emergence as a major use case in wireless communication, XR may result in large amounts of bandwidth being occupied and traffic being sent to or from the HMD. As a result, these devices may end up consuming significant amounts of power. Thus, there has also developed an increased need for improved computer or graphics processing in these devices. For example, it would be helpful to reduce the power consumed by these devices to make them more viable for wireless communication.

SUMMARY

The following presents a simplified summary of one or more aspects in order to provide a basic understanding of such aspects. This summary is not an extensive overview of all contemplated aspects, and is intended to neither identify key elements or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of wireless communication at a first device, including: obtaining, from a network entity, a hierarchical modulated image including higher priority bits and lower priority bits; obtaining gaze information from a second device, the gaze information indicating a foveal region associated with the second device; processing a portion of the hierarchical modulated image associated with the lower priority bits using the gaze information; and providing an image to be rendered at the second device including the processed portion of the hierarchical modulated image.

In some aspects, the techniques described herein relate to a first apparatus for wireless communication, including: a processor; memory coupled with the processor; and instructions stored in the memory and operable, when executed by the processor, to cause the first apparatus to: obtain, from a network entity, a hierarchical modulated image including higher priority bits and lower priority bits; obtain gaze information from a second apparatus, the gaze information indicating a foveal region associated with the second apparatus; process a portion of the hierarchical modulated image associated with the lower priority bits using the gaze information; and provide an image to be rendered at the second apparatus including the processed portion of the hierarchical modulated image.

In some aspects, the techniques described herein relate to a first apparatus for wireless communication, including: means for obtaining, from a network entity, a hierarchical modulated image including higher priority bits and lower priority bits, the means for obtaining being further configured to obtain gaze information from a second apparatus, the gaze information indicating a foveal region associated with the second apparatus; means for processing a portion of the hierarchical modulated image associated with the lower priority bits using the gaze information; and means for providing an image to be rendered at the second apparatus including the processed portion of the hierarchical modulated image.

To the accomplishment of the foregoing and related ends, the one or more aspects include the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

BRIEF DESCRIPTION OF DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIGS. 8A-8B are call flow diagrams illustrating examples of joint decoding and mediated decoding respectively in a split processing system in accordance with various aspects of the present disclosure.

FIG. 9 is a flowchart of a method of wireless communication at a device such as a UE in accordance with various aspects of the present disclosure.

DETAILED DESCRIPTION

Figure 1:
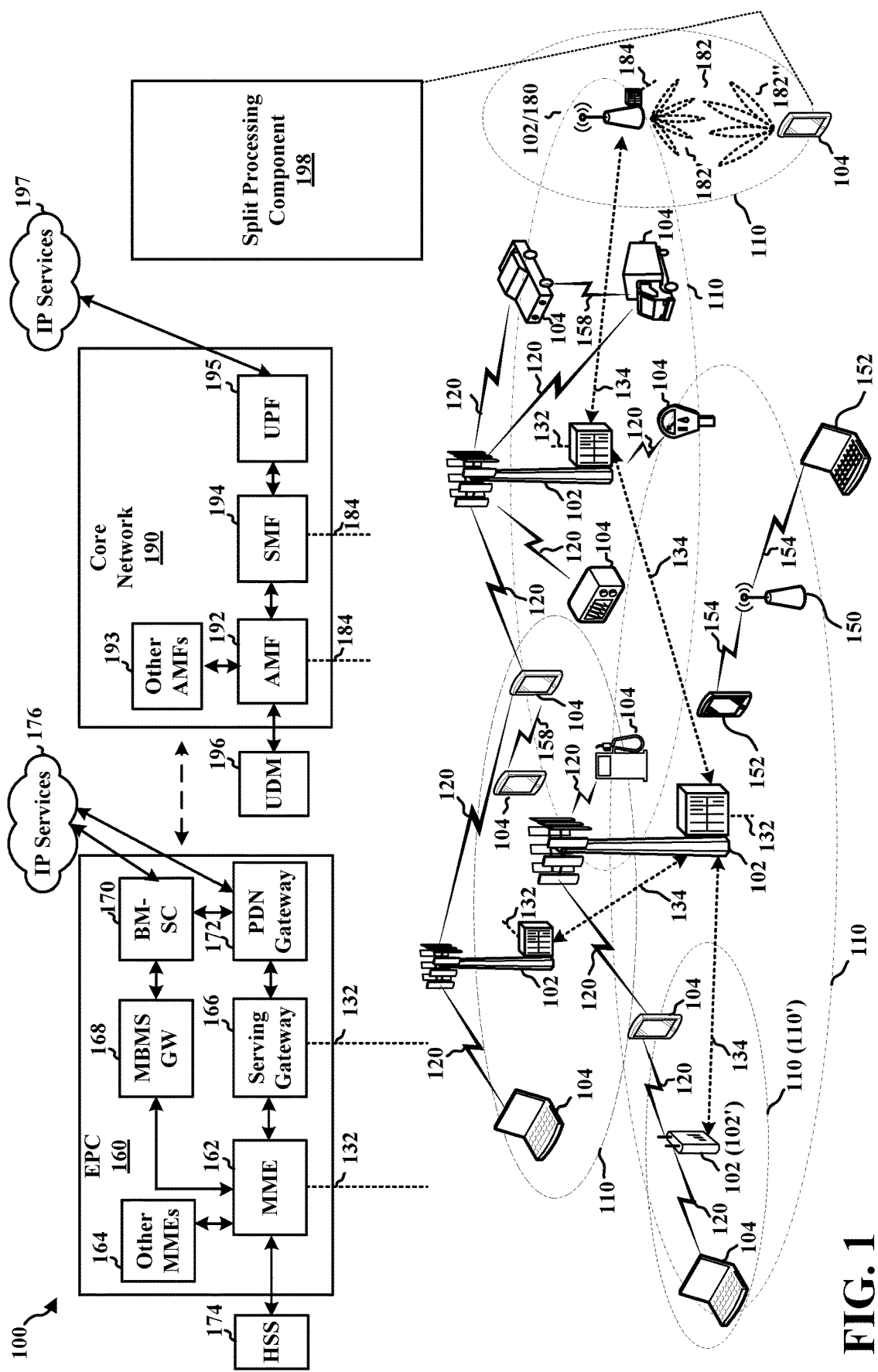
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

Various aspects of the present disclosure relate generally to communication systems, and, more particularly, to a wireless communication system incorporating techniques for graphics processing involving hierarchical modulation and foveated rendering in a split or hybrid processing system. In various aspects, a user equipment (UE) or other wireless communication device (collectively, a computing device) receives a hierarchical modulated image from a base station that incorporates extended reality (XR) or other graphical content for rendering on a head mounted display (HMD). The computing device also receives gaze information from the HMD indicating a direction where the fovea of the HMD is currently positioned. In response to determining the position or location of the fovea from the gaze information, the computing device may decode low priority bits in the hierarchical modulated image in regions closer to the fovea. The computing device may subsequently encode and transmit an image, to be rendered at the HMD, having a higher spatial resolution in the regions closer to the fovea but at a lower spatial resolution in regions farther from the fovea. In scenarios where the computing device determines that movement occurs in an area outside the foveal region, such as a falling object across multiple video frames or images, the computing device may also transmit the image to the HMD using a higher temporal resolution in these areas but at a lower temporal resolution within the foveal region. Similarly, the computing device may apply or increase the intensity of light effects depicted in the image outside the foveal region, while refraining from applying or decreasing the intensity of light effects depicted in the image inside the foveal region. The HMD may subsequently receive and decode the foveated encoded or rendered image with minimal power consumption or processing. Thus, split rendering in XR may be supported using hierarchical modulation and foveated decoding and rendering to achieve reduced latency, power consumption, and processing overhead at the HMD while leveraging the higher complexity and reception capability available at the computing device.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a split processing component 198 that is configured to obtain, from a network entity such as base station 102/180, a hierarchical modulated image including higher priority bits and lower priority bits; obtain gaze information from a second apparatus such as an HMD or other UE, the gaze information indicating a foveal region associated with the second apparatus; process a portion of the hierarchical modulated image associated with the lower priority bits using the gaze information; and provide an image to be rendered at the second apparatus including the processed portion of the hierarchical modulated image.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 2A:
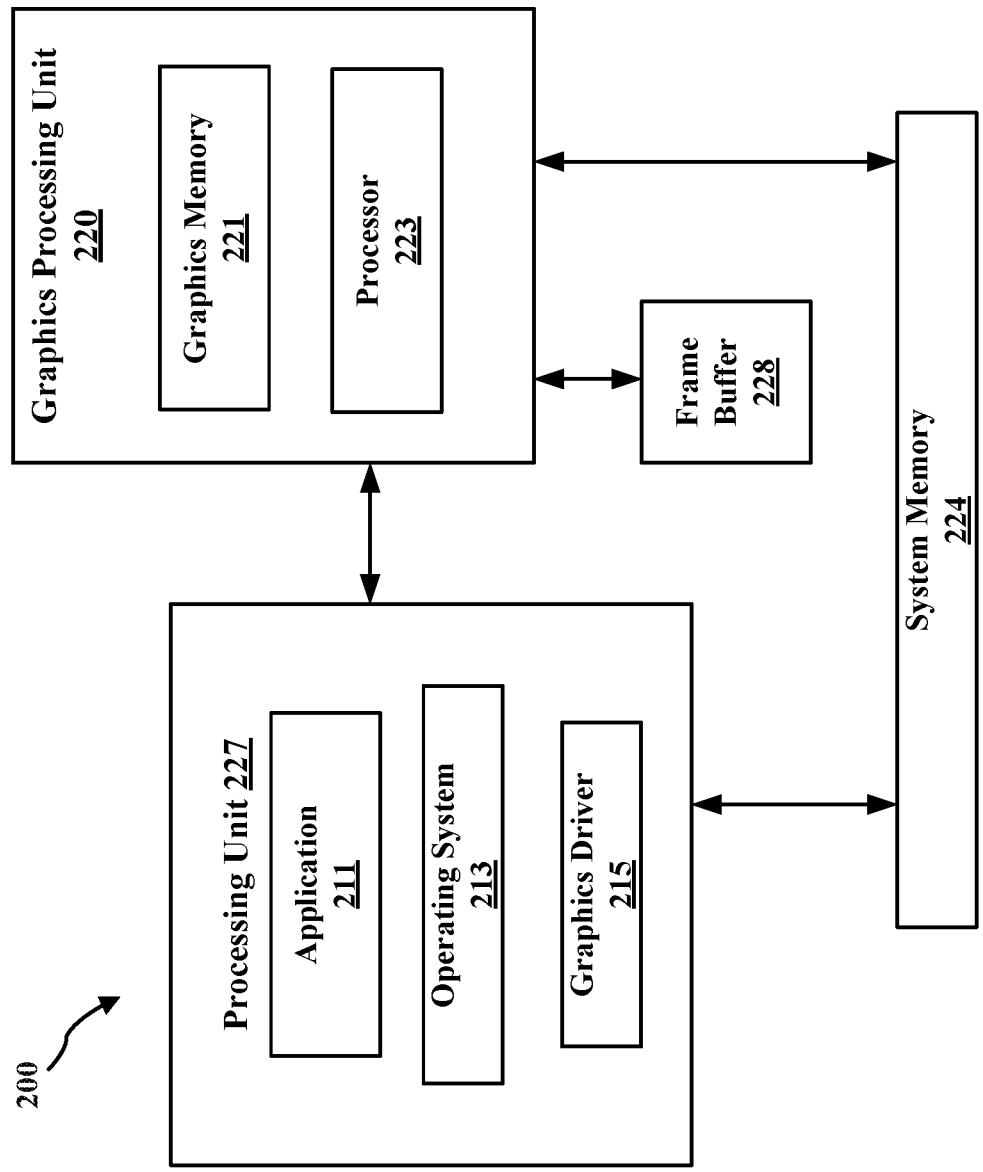
FIG. 2A is a block diagram that illustrates an example of a graphics processing system in accordance with various aspects of the present disclosure.

FIG. 2A is a block diagram that illustrates an example graphics processing system 200 configured to implement one or more techniques of this disclosure. As generally shown, the graphics processing system 200 includes a processing unit 227, a GPU 220, and a system memory 224 configured to render a 3D scene according to an exemplary aspects. Processing unit 227 may execute software application 211, operating system (OS) 213, and graphics driver 215. Moreover, system memory 224 may include indirect buffers that store the command streams for rendering primitives as well as secondary commands that are to be executed by GPU 220. GPU 220 may include graphics memory (GMEM) 221 that may be "on-chip" with GPU 220 that is coupled to a processor 223. As described in more detailed with respect to FIG. 2B, the components of the graphics processing system 200 may be part of a device, including, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like. For example, the graphics processing system 200 may be implemented in UE 104 of FIG. 1.

Processing unit 227 may be the central processing unit (CPU). GPU 220 may be a processing unit configured to perform graphics related functions such as generate and output graphics data for presentation on a display, as well as perform non-graphics related functions that exploit the massive processing parallelism provided by GPU 220. Because GPU 220 may provide general-purpose processing capabilities in addition to graphics processing capabilities, GPU 220 may be referred to as a general-purpose GPU (GP-GPU). Examples of processing unit 227 and GPU 220 include, but are not limited to, a digital signal processor (DSP), a general-purpose microprocessor, application specific integrated circuit (ASIC), field programmable logic array (FPGA), or other equivalent integrated or discrete logic circuitry. In some examples, GPU 220 may be a microprocessor designed for specific usage such as providing massive parallel processing for processing graphics, as well as for executing non-graphics related applications. Furthermore, although processing unit 227 and GPU 220 are illustrated as separate components, aspects of this disclosure are not so limited and can be, for example, residing in a common integrated circuit (IC). In some examples, the GPU 220 as described herein may be any type of processor that can perform graphics processing.

Software application 211 that executes on processing unit 227 may include one or more graphics rendering instructions that instruct processing unit 227 to cause the rendering of graphics data to a display (not shown in FIG. 2A). In some examples, the graphics rendering instructions may include software instructions that may conform to a graphics application programming interface (API). In order to process the graphics rendering instructions, processing unit 227 may issue one or more graphics rendering commands to GPU 220 (e.g., through graphics driver 215) to cause GPU 220 to perform some or all of the rendering of the graphics data. In some examples, the graphics data to be rendered may include a list of graphics primitives, e.g., points, lines, triangles, quadrilaterals, triangle strips, etc.

GPU 220 may be configured to perform graphics operations to render one or more graphics primitives to a display. Accordingly, when one of the software applications executing on processing unit 227 requires graphics processing, processing unit 227 may provide graphics commands and graphics data to GPU 220 for rendering to the display. The graphics data may include, e.g., drawing commands, state information, primitive information, texture information, etc. GPU 220 may, in some instances, be built with a highly parallel structure that provides more efficient processing of complex graphic-related operations than processing unit 227. For example, GPU 220 may include a plurality of processing elements that are configured to operate on multiple vertices or pixels in a parallel manner.

GPU 220 may be directly coupled to GMEM 221. In other words, GPU 220 may process data locally using a local storage, instead of off-chip memory. This allows GPU 220 to operate in a more efficient manner by eliminating the need of GPU 220 to read and write data via, e.g., a shared bus, which may experience heavy bus traffic. GMEM 221 may include one or more volatile or non-volatile memories or storage devices, such as, e.g., random access memory (RAM), static RAM (SRAM), dynamic RAM (DRAM), and one or more registers.

The GMEM 221 may also be directly coupled to a processor 223. The processor 223 may be a CPU, a GPU, a general-purpose GPU (GPGPU), or any other processing unit that may be configured to perform graphics processing. In some examples, the processor 223 may be integrated into a motherboard of the device 204. In some examples, the processor 223 may be present on a graphics card that is installed in a port in a motherboard of the device 204 or may be otherwise incorporated within a peripheral device configured to interoperate with the device 204. The processor 223 may include one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processor 223 may store instructions for the software in a suitable, non-transitory computer-readable storage medium, e.g., internal memory 229, and may execute the instructions in hardware using one or more processors to perform the techniques of this disclosure. Any of the foregoing, including hardware, software, a combination of hardware and software, etc., may be considered to be one or more processors.

Processing unit 227 and/or GPU 220 may store rendered image data in a frame buffer 228, which may be an independent memory or may be is allocated within system memory 224. A display processor may retrieve the rendered image data from frame buffer 228 and display the rendered image data on a display.

System memory 224 may be a memory in the device and may reside external to processing unit 227 and GPU 220, i.e., off-chip with respect to processing unit 227, and off-chip with respect to GPU 220. System memory 224 may store applications that are executed by processing unit 227 and GPU 220. Furthermore, system memory 224 may store data upon which the executed applications operate, as well as the data that result from the application.

System memory 224 may store program modules, instructions, or both that are accessible for execution by processing unit 227, data for use by the programs executing on processing unit 227, or two or more of these. For example, system memory 224 may store a window manager application that is used by processing unit 227 to present a graphical user interface (GUI) on a display. In addition, system memory 224 may store user applications and application surface data associated with the applications. As explained in detail below, system memory 224 may act as a device memory for GPU 220 and may store data to be operated on by GPU 220 as well as data resulting from operations performed by GPU 220. For example, system memory 224 may store any combination of texture buffers, depth buffers, stencil buffers, vertex buffers, frame buffers, or the like.

Examples of system memory 224 include, but are not limited to, a random-access memory (RAM), a read only memory (ROM), or an electrically erasable programmable read-only memory (EEPROM), or any other medium that can be used to carry or store desired program code in the form of instructions or data structures and that can be accessed by a computer or a processor. As one example, system memory 224 may be removed from the device, and moved to another device. As another example, a storage device, substantially similar to system memory 224, may be inserted into the device.

Figure 2B:
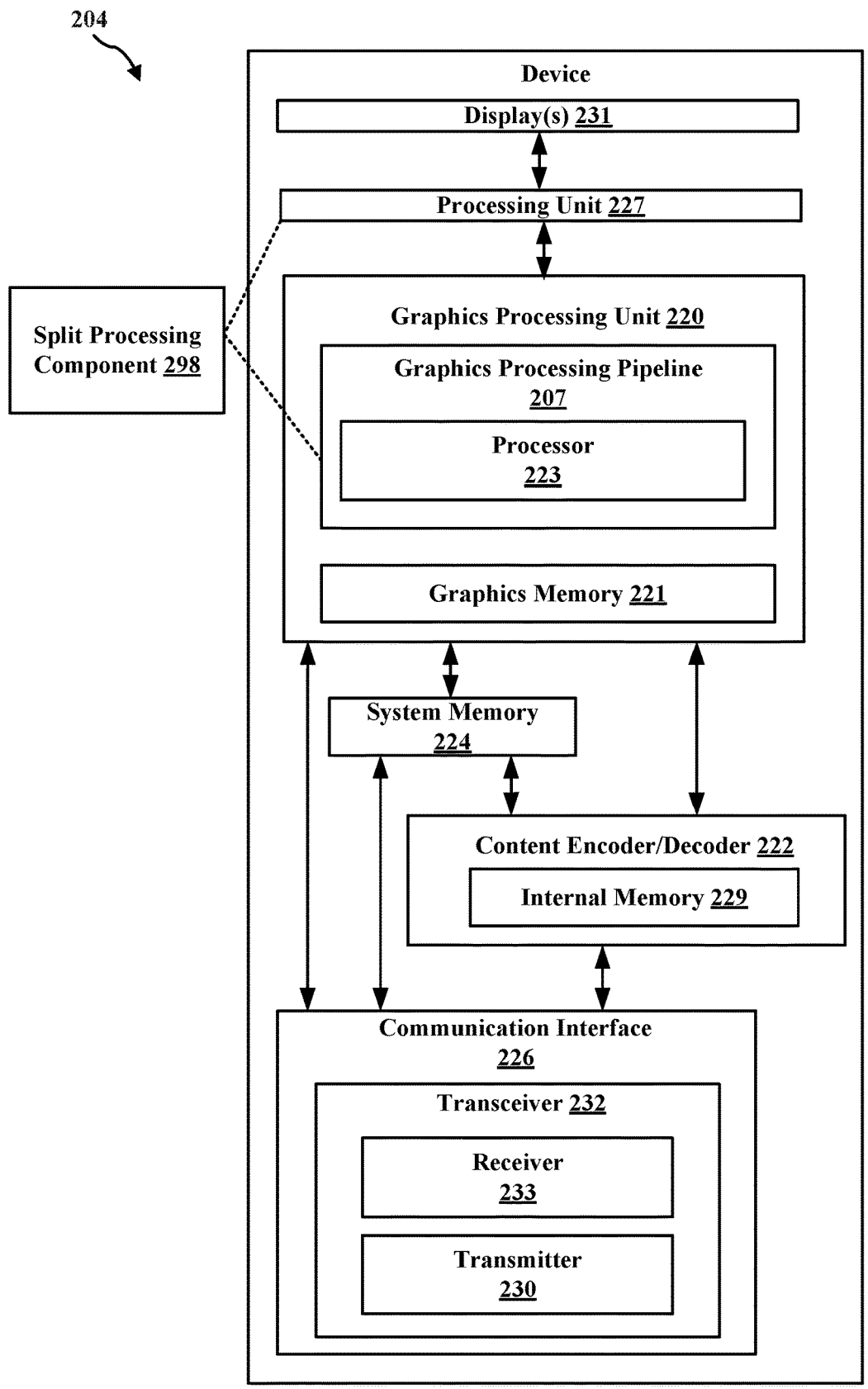
FIG. 2B is a block diagram that illustrates an example of a device such as a user equipment (UE) in the graphics processing system in accordance with various aspects of the present disclosure.

FIG. 2B is a more detailed block diagram that illustrates a computing device 204 configured to implement one or more techniques of this disclosure. It is noted that the device 204 shown in FIG. 2B may include the graphics processing system 200 shown in FIG. 2A, and may correspond to UE 104 in FIG. 1 or a different wireless computing device. In this regard, the device 204 of FIG. 2B includes a processing unit 227, a GPU 220 and a system memory 224.

As further shown, the device 204 that may include one or more components configured to perform one or more techniques of this disclosure. In the example shown, the device 204 may include a GPU 220, a content encoder/decoder 222, and system memory 224. In some aspects, the device 204 can include a number of additional and/or optional components, e.g., a communication interface 226, a transceiver 232, a receiver 233, and a transmitter 230, and one or more displays 231. Reference to the display 231 may refer to the one or more displays 231. For example, the display 231 may include a single display or multiple displays. The display 231 may include a first display and a second display. In further examples, the results of the graphics processing may not be displayed on the device, e.g., the displays 231 may not receive any frames for presentment thereon. Instead, the frames or graphics processing results may be transferred to another device. In some aspects, this can be referred to as hybrid-rendering.

The GPU 220 includes graphics memory (GMEM) 221. The GPU 220 may be configured to perform graphics processing, such as in a graphics processing pipeline 207. The content encoder/decoder 222 may include an internal memory 229. In some examples, the device 204 may include a display processor, such as the processing unit 227, to perform one or more display processing techniques on one or more frames generated by the GPU 220 before presentment by the one or more displays 231 as described above. The processing unit 227 may be configured to perform display processing. The one or more displays 231 may be configured to display or otherwise present frames processed by the processing unit 227. In some examples, the one or more displays 231 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the GPU 220 and the content encoder/decoder 222, such as system memory 224 as described above, may be accessible to the GPU 220 and the content encoder/decoder 222. For example, the GPU 220 and the content encoder/decoder 222 may be configured to read from and/or write to external memory, such as the system memory 224. The GPU 220 and the content encoder/decoder 222 may be communicatively coupled to the system memory 224 over a bus. In some examples, the GPU 220 and the content encoder/decoder 222 may be communicatively coupled to each other over the bus or a different connection.

The content encoder/decoder 222 may be configured to receive graphical content from any source, such as the system memory 224 and/or the communication interface 226. The system memory 224 may be configured to store received encoded or decoded graphical content. The content encoder/decoder 222 may be configured to receive encoded or decoded graphical content, e.g., from the system memory 224 and/or the communication interface 226, in the form of encoded pixel data. The content encoder/decoder 222 may be configured to encode or decode any graphical content.

The GMEM 221 or the system memory 224 may be a non-transitory storage medium according to some examples. The term "non-transitory" may indicate that the storage medium is not embodied in a carrier wave or a propagated signal. However, the term "non-transitory" should not be interpreted to mean that GMEM 221 or the system memory 224 is non-movable or that its contents are static. As one example, the system memory 224 may be removed from the device 204 and moved to another device. As another example, the system memory 224 may not be removable from the device 204.

The GPU may be configured to perform graphics processing according to the techniques as described herein. In some examples, the GPU 220 may be integrated into a motherboard of the device 204. In some examples, the GPU 220 may be present on a graphics card that is installed in a port in a motherboard of the device 204, or may be otherwise incorporated within a peripheral device configured to interoperate with the device 204. The GPU 220 may include one or more processors, such as one or more microprocessors, GPUs, ASICs, FPGAS, ALUs, DSPs, discrete logic, software, hardware, firmware, other equivalent integrated or discrete logic circuitry, or any combinations thereof. If the techniques are implemented partially in software, the GPU 220 may store instructions for the software in a suitable, non-transitory computer-readable storage medium and may execute the instructions in hardware using one or more processors to perform the techniques of this disclosure. Any of the foregoing, including hardware, software, a combination of hardware and software, etc., may be considered to be one or more processors.

The content encoder/decoder 222 may be any processing unit configured to perform content encoding/decoding. In some examples, the content encoder/decoder 222 may be integrated into a motherboard of the device 204. The content encoder/decoder 222 may include one or more processors, such as one or more microprocessors, ASICs, FPGAs, ALUs, DSPs, video processors, discrete logic, software, hardware, firmware, other equivalent integrated or discrete logic circuitry, or any combinations thereof. If the techniques are implemented partially in software, the content encoder/decoder 222 may store instructions for the software in a suitable, non-transitory computer-readable storage medium, e.g., internal memory 229, and may execute the instructions in hardware using one or more processors to perform the techniques of this disclosure. Any of the foregoing, including hardware, software, a combination of hardware and software, etc., may be considered to be one or more processors.

In some aspects, the device 204 can include an optional communication interface 226. The communication interface 226 may include a receiver 233 and a transmitter 230. The receiver 233 may be configured to perform any receiving function described herein with respect to the device 204. Additionally, the receiver 233 may be configured to receive information, e.g., eye or head position information, rendering commands, or location information, from another device. The transmitter 230 may be configured to perform any transmitting function described herein with respect to the device 204. For example, the transmitter 230 may be configured to transmit information to another device, which may include a request for content. The receiver 233 and the transmitter 230 may be combined into a transceiver 232. In such examples, the transceiver 232 may be configured to perform any receiving function and/or transmitting function described herein with respect to the device 204.

Referring again to FIG. 2B, in certain aspects, the graphics processing unit 220 or the processing unit 227 may include a split processing component 298 that is configured to control the processor (comprising a CPU or GPU) or general-purpose processor to perform graphics processing as depicted by a dotted line. Moreover, the split processing component 298 may be configured to perform the operations of split processing component 198 in FIG. 1. In some examples, the split processing component 298 may be a hardware, software, or a combination thereof. The components may be separate components or sub-components of a single component.

As described herein, a device, such as the device 204, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any of the examples mentioned for UE 104, any device configured to generate graphical content, or any device configured to perform one or more techniques described herein. Processes herein may be described as performed by a particular component, e.g., a GPU, but, in further embodiments, can be performed using other components, e.g., a CPU, consistent with disclosed embodiments.

Figure 3:
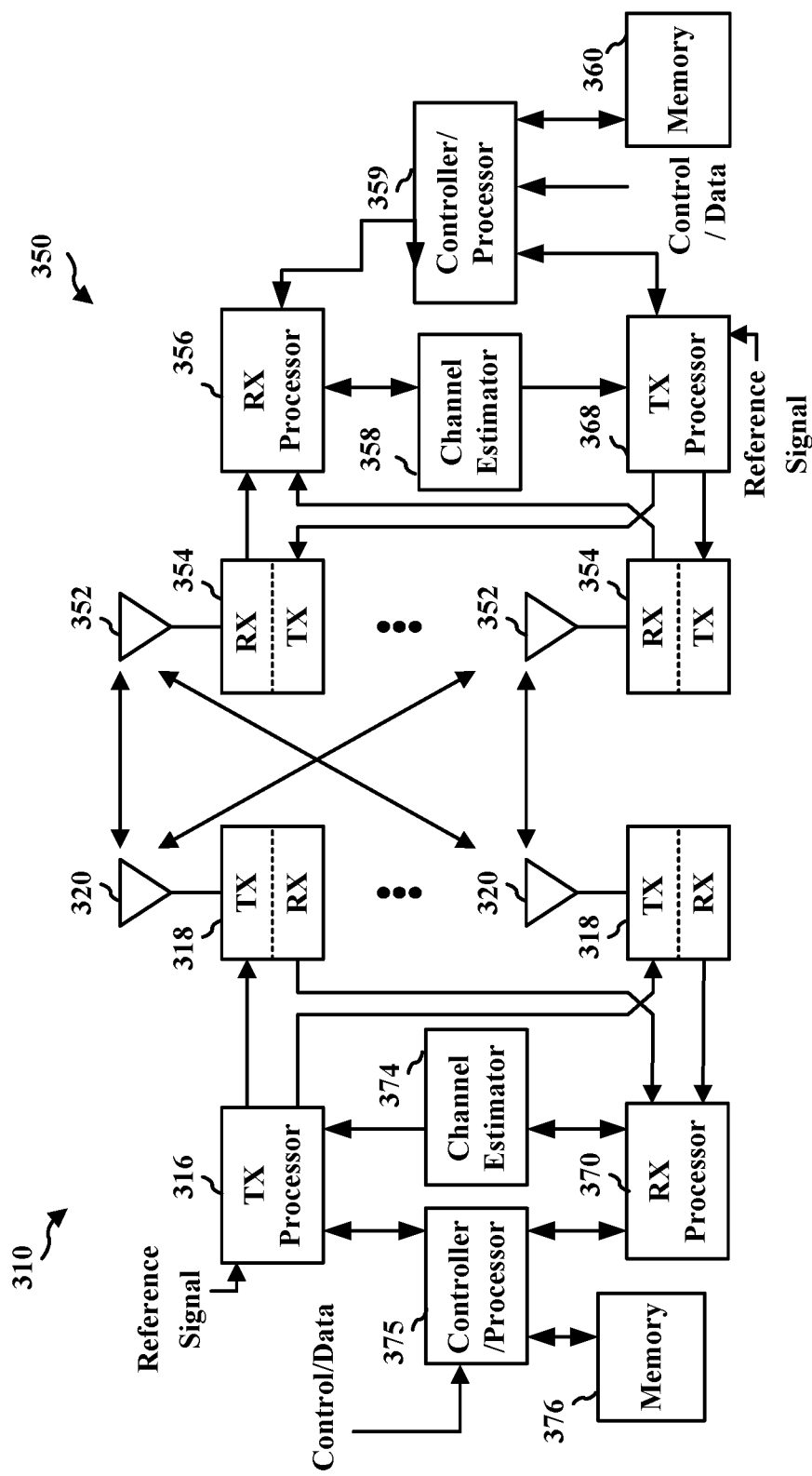
FIG. 3 is a diagram illustrating an example of a base station and a UE in an access network.

FIG. 3 is a block diagram of a base station 310 in communication with a wireless device 350, such as UE 104 or device 204, in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the wireless device 350. Each spatial stream may then be provided to a different antenna 320 via a separate transmitter 318TX. Each transmitter 318TX may modulate an RF carrier with a respective spatial stream for transmission.

At the wireless device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the wireless device 350. If multiple spatial streams are destined for the wireless device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the wireless device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the wireless device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with split processing component 198 of FIG. 1 or split processing component 298 of FIG. 2B.

Extended reality (XR) is emerging as a major use case in wireless communication networks. For example, XR may result in large amounts of bandwidth being occupied and traffic being sent in wireless communication to wireless computing devices such as HMDs. As a result, HMDs using XR tend to consume significant amounts of power. Thus, it would be helpful to reduce the power consumed by these devices in wireless communication networks.

Figure 4:
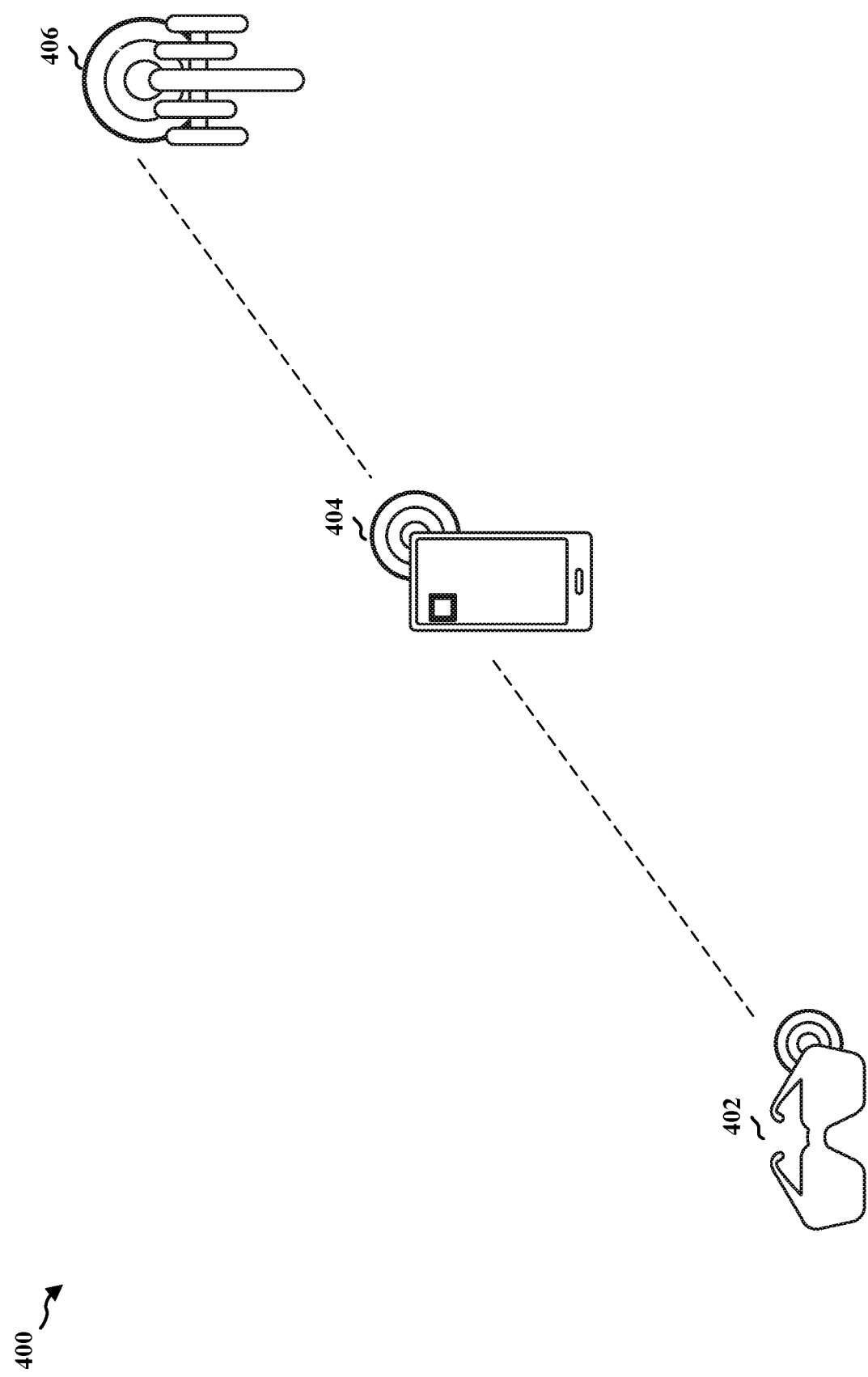
FIG. 4 is a conceptual diagram illustrating an example of a split or hybrid processing system in accordance with various aspects of the present disclosure.

FIG. 4 illustrates an example of a hybrid or split processing system 400, or a split rendering system, which may be used to reduce power consumption of an HMD 402. In hybrid or split rendering, the rendering of an image or frame can be performed in multiple locations and/or on multiple devices, e.g., in order to divide the rendering workload between different devices. For example, the rendering workload can be split between two client devices, such as a UE 404 and the HMD 402. Thus, in the example of FIG. 4, a lightweight, low power, and low cost HMD may be provided where most, or all, of the heavy processing may be transferred or offloaded to another device such as UE 404 or a base station 406 for cloud edge processing. Such aggressive partitioning allows the HMD 402 to solely act as an immersive, audio visual human interface with the UE 404 or other client device. This UE 404 or other client device in turn may perform the bulk, if not all, of the rendering and processing.

In split processing or rendering systems, hierarchical modulation may be applied to reduce the latency or processing overhead associated with video encoding, transmission, reception, decoding, and rendering in HMDs. In hierarchical modulation, information bits that are transmitted in a data signal are divided between high priority streams or bits carrying higher resolution data, and low priority streams or bits carrying lower resolution data, in contrast to non-hierarchical modulation schemes. For example, in a non-hierarchical modulation scheme where quadrature amplitude modulation (QAM) is applied to a transmission from a base station, the base station generally modulates a carrier frequency including data with an in-phase component and a quadrature component representing one of multiple points (e.g., 64 points in 64 QAM) or bit sequences (6-bit sequences in 64 QAM), where each of these points or bit sequences have a same priority with respect to each other point or bit sequence. As a result, if noise in the reception or some other factor results in one or more of these points or bit sequences being mis-decoded at the receiver, then an error in reception may result. However, if the base station applies hierarchical modulation, these points or bit sequences are divided between low priority bits and high priority bits with different modulation orders. For example, high priority bits of an image may be modulated with a lower modulation order, such as QPSK, while low priority bits of an image may be modulated with a higher modulation order such as 64 QAM. Since lower modulation orders have larger separation between different points or bit sequences then those of higher modulation orders, the high priority bits with lower modulation orders may still be decodable even in bad channel conditions or low signal to noise ratio (SNR) environments, while the low priority bits with higher modulation orders may not be decodable absent better channel conditions.

Thus, a receiver of a hierarchically modulated image may decode a low resolution image in worse channel conditions or a high resolution image in better channel conditions. For example, in a Digital Video Broadcasting-Terrestrial (DVB-T) standard, a transmitter may apply hierarchical modulation to provide low resolution video to a receiver with high priority bits in a worse channel condition (lower SNR), but improved or high resolution video with low priority bits in better channel conditions (higher SNR). Thus, a receiver may be able to decode the video frame with improved video resolution at higher modulation orders in better channel conditions, while still being able to decode the video frame at lower modulation orders even in worse channel conditions, albeit at lower resolution.

Figure 5:
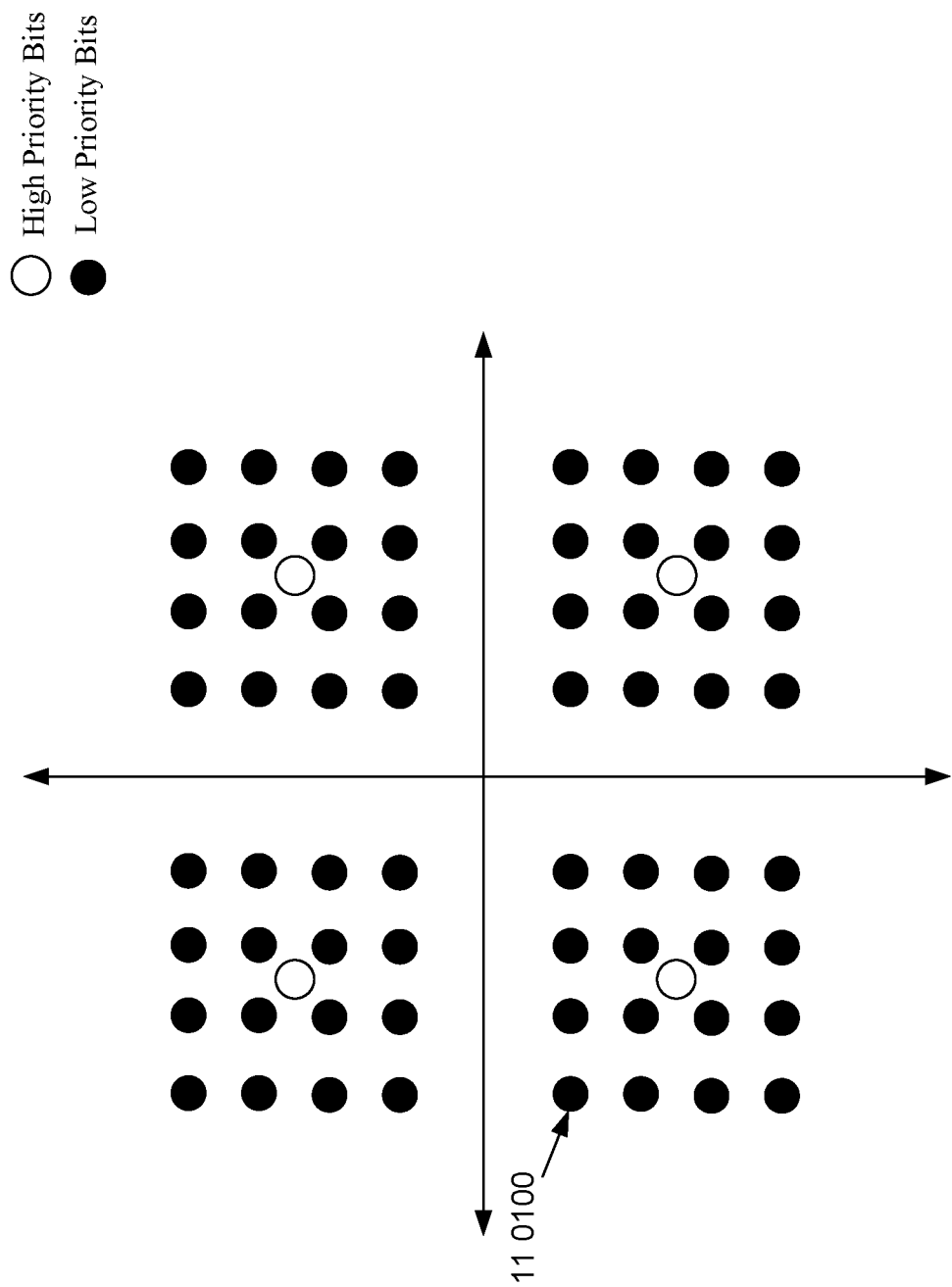
FIG. 5 is a constellation diagram illustrating an example of hierarchical modulation in accordance with various aspects of the present disclosure.

FIG. 5 illustrates an example 500 of a constellation diagram for a hierarchical modulated data signal using 64 QAM with an embedded QPSK stream. For instance, the high priority bits associated with QPSK modulation may include two-bit sequences or four points (the white center circles) in the center of respective quadrants, while the low priority bits associated with 64 QAM may include 6-bit sequences or 64 points (the black circles) within the various quadrants. Here, center points in each quadrant may be represented by high priority bits with larger spatial separation with respect to each other (and thus include easier decodability in bad channel conditions), while the remaining points may be represented by low priority bits with smaller spatial separation with respect to each other (and thus include harder decodability in bad channel conditions). As an example, the labeled black point corresponding to the 6-bit sequence 110100 illustrated in FIG. 5 may be modulated such that its most significant two bits 11 (the high priority bits in this example) are QPSK-modulated, while the remaining bits 0100 (the low priority bits in this example) are 64-QAM modulated.

When applying hierarchical modulation, the transmitter may initially modulate the signal with the high priority stream such as QPSK and then take that modulated signal and modulate it again with the higher resolution or lower priority data using the higher modulation order such as 64 QAM. This embedded, modulated signal may be output and provided to the receiver, which in turn may decode the signal initially using the lower modulation order such as QPSK to receive the high priority bits or lower resolution bits. If the SNR experienced by the receiver is relatively good, the receiver may also attempt to decode this signal using the higher modulation order such as 64 QAM to obtain the low priority or higher resolution bits. Prior to the modulation and demodulation of the signal, some sort of signaling between the transmitter and receiver may occur in which the transmitter informs the receiver of the modulation and encoding schemes that the transmitter will apply for high priority and low priority bits in hierarchical modulation. For example, this information may be indicated in downlink control information or some other information received from the base station. Furthermore the transmitter may provide normalization information to the receiver indicating that a larger distance is applied between points across quadrants than between points within a single quadrant to facilitate decoding of hierarchical modulated signals.

Thus, the base station may apply hierarchical modulation to modulate high resolution data with the high priority bits or lower modulation order, while modulating lower resolution data with the low priority bits or higher modulation order, to improve the likelihood of a receiver successfully decoding a transmission. However, an HMD in a split processing system, such as HMD 402, that attempts to receive and decode an entire, hierarchical modulated video frame may still observe significant latency and processing overhead associated with the reception and decoding of lower priority bits at higher modulation orders in order to benefit from the improved resolution associated with those bits. Similarly, another device such as a UE or base station which interacts with the HMD in split rendering, such as UE 404 or base station 406, may observe similar latency and processing overhead associated with the transmission and encoding of such lower priority bits when sending an entire, hierarchical modulated video frame to the HMD. Therefore, it would be helpful to further reduce the latency and processing overhead associated with split video rendering using hierarchical modulation.

Figure 6:
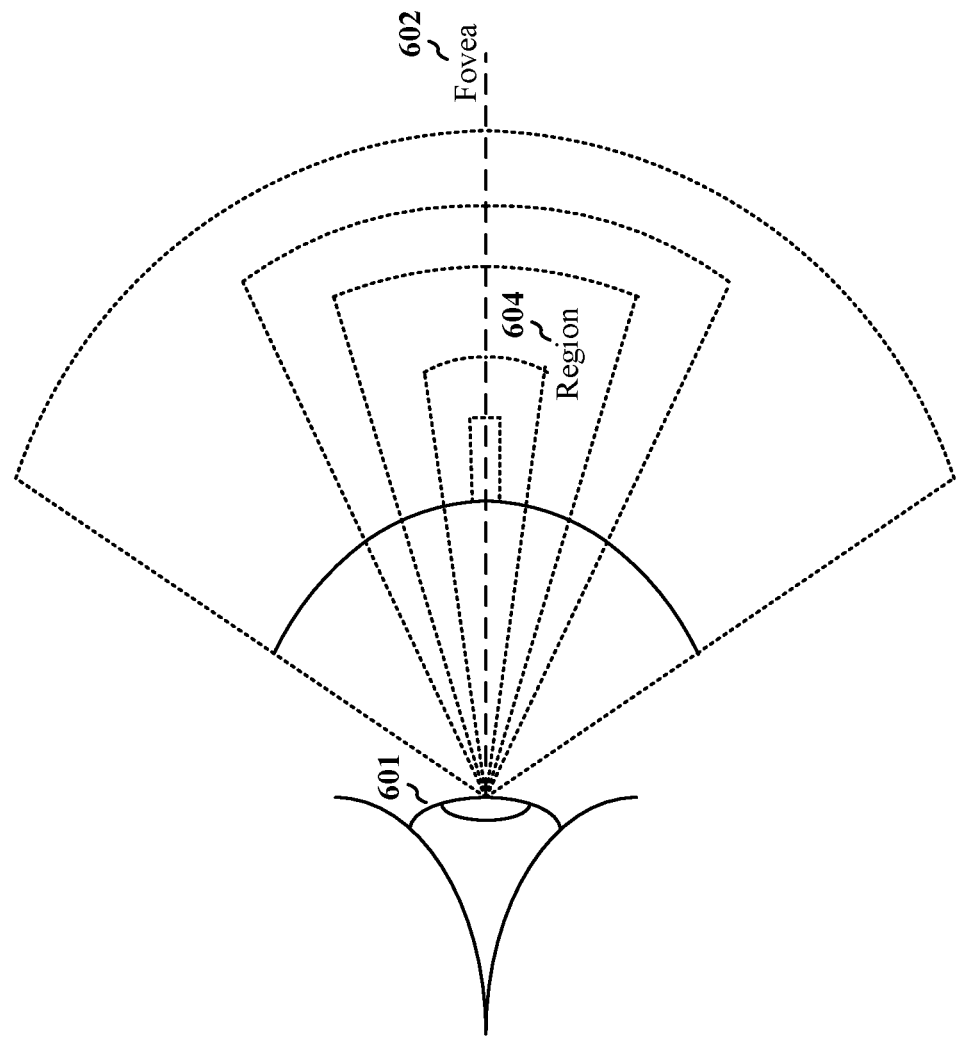
FIG. 6 is a conceptual diagram illustrating an example of relative visual characteristics of a human eye in accordance with various aspects of the present disclosure.

Accordingly, aspects of the present disclosure provide for further reduced latency and processing overhead by applying foveated rendering to hierarchical modulated images. Foveated rendering is based on the phenomenon that the human eye has very different properties across its field of view. For instance, FIG. 6 illustrates an example 600 of relative vision characteristics of a typical human eye. Near the center of retina 601, resolution may be maximal approaching downwards to 0.5-arcmin, or 0.008 degree at a fovea 602 of a human eye. As a result, reading, symbol discrimination, and color discrimination tend to occur within an area or region 604 closer to the fovea. In contrast, while spatial resolution degrades the further away from the center of the retina, light sensitivity and movement sensitivity increases. This is due to the fact that cones in fovea 602 and closer to the center of the retina include very high-resolution color vision, but low light sensitivity, while rods attached to neurons outside the fovea and closer to the edges of the retina include very light-sensitive and highly motion-sensitive, but low resolution, black and white vision.

Figure 7:
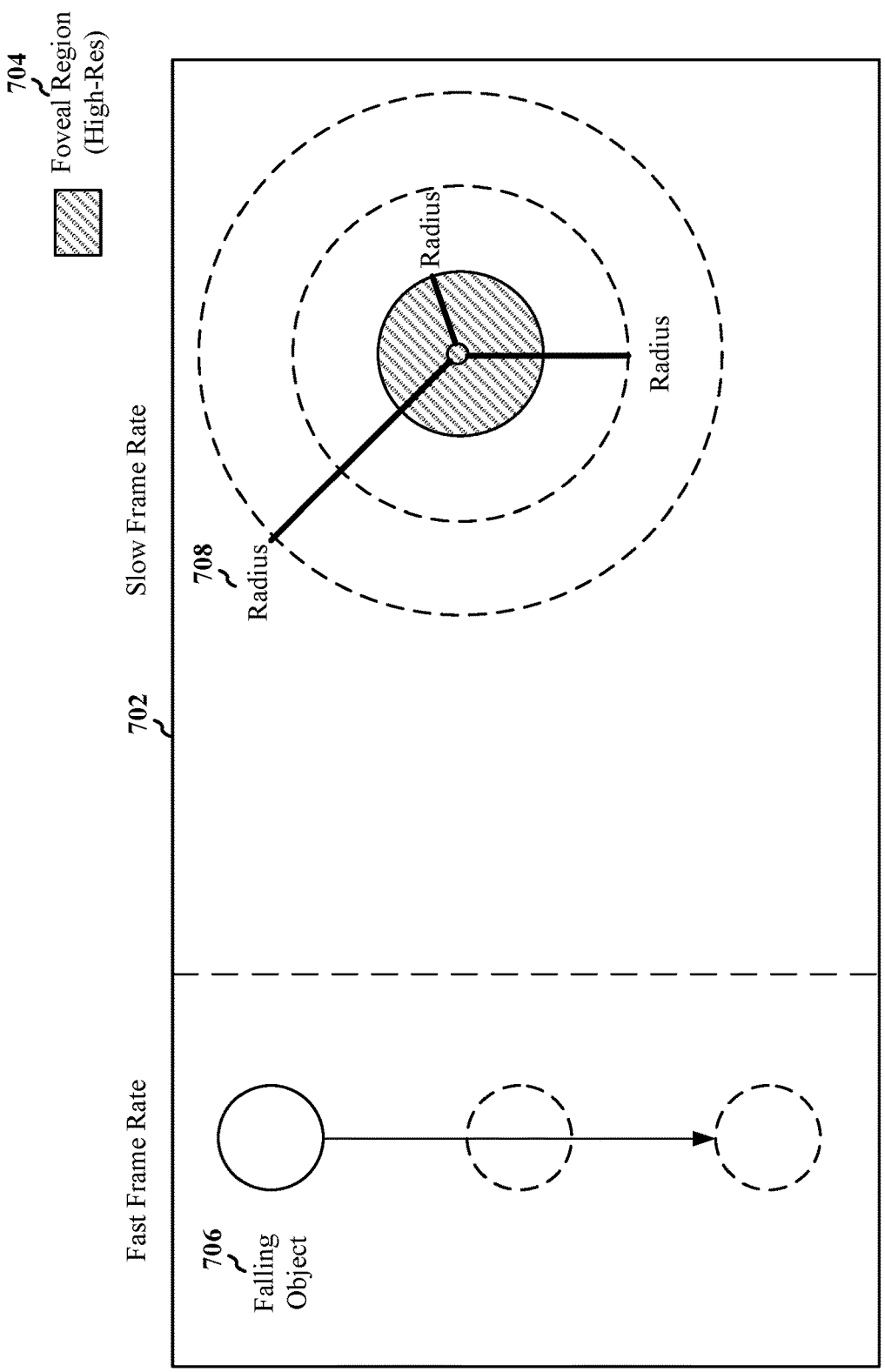
FIG. 7 is a conceptual diagram illustrating an example of a hierarchically modulated image that is processed using foveated rendering in accordance with various aspects of the present disclosure.

FIG. 7 illustrates an example 700 of a hierarchically modulated image 702 in which a UE in a split processing system such as UE 404 may apply foveated processing or rendering to improve video encoding or rendering latency, as well as perceived image resolution or quality at the HMD 402. In addition to receiving hierarchical modulated image 702 from a base station such as base station 406 for split rendering at HMD 402, UE 404 may also receive gaze information from the HMD 402 indicating a direction where the region 604 or fovea 602 associated with the HMD 402 is currently positioned. The gaze information may be transmitted in a report and include, for example, an elevation angle, azimuth angle, and focus depth which are measured using camera sensors in the HMD 402 for each human eye, and the UE 404 may determine the direction of gaze or current location or position of the foveal region or fovea 602 of each eye from this gaze information. In response to determining the position or location of a foveal region 704 from the gaze information, the UE may select to decode the low priority bits in the hierarchical modulated image in areas closer to the fovea (within foveal region 704) to obtain the high resolution data in that region.

Using this decoded, high resolution data, the UE may encode and transmit at least a portion of the hierarchical modulated image 702 to be rendered at the HMD (in a new, processed image without hierarchical modulation). The processed image may include a higher spatial resolution (more bits per pixel, more color detail, etc.) in the foveal region 704 but a lower spatial resolution (less bits per pixel, less color detail, etc.) outside the foveal region 704. In scenarios where the UE 404 determines that movement occurs in an area outside the foveal region 704, such as a falling object 706 across multiple video frames or images, the UE may also transmit the image to the HMD 402 using a higher temporal resolution (a faster frame rate or update rate such as 120 Hz) in these areas but at a lower temporal resolution (a slower frame rate or update rate such as 60 Hz) within the foveal region 704. Similarly, the UE 404 may apply or increase the intensity of light effects depicted in the image outside the foveal region 704, while refraining from applying or decreasing the intensity of light effects depicted in the image inside the foveal region. The HMD 402 may subsequently receive and decode the foveated encoded or rendered image. Thus, split rendering in XR may be supported using hierarchical modulation and foveated decoding and rendering to achieve reduced latency, power consumption, and processing overhead at the HMD while leveraging the higher complexity and reception capability available at the UE.

In the foregoing example, the gaze information which the UE 404 receives from the HMD 402 may indicate the location or position of the region 604 or fovea 602 of the retina 601 of the user of the HMD 402, and the UE 404 may determine the foveal region 704 of the hierarchically modulated image 702 in which to decode the high priority bits from the gaze information. For example, as illustrated in the example of FIG. 7, the foveal region 704 may include a circular area in the hierarchically modulated image 702 which center point corresponds to the indicated position of the fovea and which radius 708 is a configured or preconfigured value set by the UE 404 or by the HMD 402 in the gaze information report. The UE 404 may accordingly determine which region corresponds to the fovea by comparing data received in the gaze information with the corresponding location of pixels in the circular area of the image that falls within this configured or preconfigured radius, or in some other manner. By setting different values for the foveal radius, the UE 404 or HMD 402 may control the size of the foveal region 704 and thus the amount of high spatial resolution data surrounding the fovea to be provided in the rendered image at the HMD 402, thereby adapting the level of complexity in UE encoding and XR decoding to different user environments, retinal characteristics, or UE or HMD capabilities. Moreover, the UE 404 may perform graduated processing at different areas of the foveal region, for example, by decoding more higher priority bits and providing images with a greater amount of high spatial resolution data in areas closer to the fovea, while decoding less higher priority bits and providing images with a lower amount of high spatial resolution data in areas farther from the fovea (but still within the foveal region). This graduated processing may account for the graduated reduction of cones in the retina capable of discerning higher resolution data the farther the distance away from the fovea.

FIGS. 8A-8B illustrate examples of different split or hybrid video decoding schemes using hierarchical modulation and foveated rendering. In particular, FIG. 8A illustrates an example of a joint decoding scheme in which a base station 802 provides video streams using hierarchical modulation via multicast to a UE 804 and an HMD 806, and both the UE and HMD decode the video streams. In contrast, FIG. 8B illustrates an example of a mediated decoding scheme in which the base station 802 provides the hierarchical modulated video stream via unicast to the UE 804 but not to the HMD 806; instead, the UE provides a mediated video stream to the HMD. In either example, the base station 802 applies hierarchical modulation to convey its video streams to the UE 804 or HMD 806. For example, coarse, rough, or lower resolution features of the images may be conveyed on high priority bits with lower modulation orders such as QPSK so that the receiver may successfully decode these features in relatively low SNR conditions with minimal processing and power consumption. On the other hand, finer or higher resolution features of the images may be conveyed on low priority bits with higher modulation orders such as 64QAM so that the UE or HMD may select to decode these features in relatively high SNR conditions when they are capable of more complicated video processing. While the examples of FIGS. 8A-8B specifically illustrate and describe the following concepts with respect to a base station, a UE and an HMD, it should be understood that the following description may similarly apply to other wireless devices in a split processing or rendering system. For example, HMD 806 may be replaced by a different UE or other wireless device.

Referring to FIG. 8A, the HMD 806 receives a hierarchically modulated image 808 in a signal from the base station. Hierarchically modulated image 808 corresponds to hierarchically modulated image 702 of FIG. 7. The HMD 806 may decode the high priority bits in the signal, which includes the rough or coarse features (low resolution details) of the image. The HMD 806 may thus be able to obtain the coarse features of the image even in a low SNR environment while performing minimal processing to conserve power. Meanwhile, the UE 804 may receive the same hierarchical modulated image 808 from the base station 802 (since the signal is transmitted in multicast or broadcast), and the UE 804 may decode the higher resolution details of the image to improve the quality of the rendered image at the HMD 806. In particular, at block 810, the UE 804 processes the video it receives based on current gaze information of the HMD 806. For example, the HMD 806 may provide gaze information 812 to the UE 804 indicating a current position or location of the fovea associated with the HMD, such as fovea 602 or foveal region 704, and the UE may decode the low priority bits of the hierarchically modulated image 808 in the region corresponding to this fovea 602 or foveal region 704, while refraining from decoding low priority bits of the hierarchically modulated image 808 in areas outside the foveal region. The UE 804 may also add additional details to the hierarchically modulated image 808 received from the base station 802, such as augmented reality (AR) rendering, before providing a processed image 814 including the decoded low priority bits and optionally the additional details to the HMD 806. Even though the UE 804 and the HMD 806 may be located close together and thus experience similar SNR conditions, the UE 804 has the capability of performing significantly more intensive computations, has better reception through its antennas, and has more processing power, than the HMD 806, and so the UE 804 may more successfully and efficiently decode the higher resolution data in the hierarchically modulated image 808 than the HMD 806.

After performing the processing at block 810, the UE 804 may transmit to the HMD 806 the finer or higher resolution details of the hierarchically modulated image 808 in processed image 814. These higher resolution details may correspond to the gaze information 812 the UE 804 receives from the HMD 806. For example, the UE 804 may transmit processed image 814 including high resolution data in the foveal region 704 associated with the HMD 806. Moreover, since the HMD 806 has already received the lower resolution details in the full, corresponding, hierarchically modulated image 808 from the base station 802, the UE 804 may refrain from providing these same details outside the foveal region 704 in the processed image 814. Thus, the processed image 814 may represent a portion of the hierarchically modulated image 808 from the base station 802, for example including the high resolution details within the foveal region 704, but no details (e.g., white space) outside the foveal region 704. Alternatively, the UE 804 may provide the full image including lower resolution details (e.g., no white space) outside the foveal region 704.

The UE 804 may provide this processed image 814 to the HMD 806 in an uncompressed or minimally compressed video format. Minimal or no compression may allow for minimal decoding complexity or power consumption at the HMD 806. For instance, the UE 804 may be wirelessly connected to the HMD 806 via a High-Definition Multimedia Interface (HDMI) interface, and the UE 804 may convey the raw or uncompressed, processed image to the HMD 806 over the HDMI interface. Such uncompressed format allows the HMD 806 to obtain the image without being required to perform decompression or other additional processing. Alternatively, the processed image 814 may be minimally compressed such that high frequency components are removed, quantization and entropy coding is applied, motion vectors are omitted, and the like. For example, the UE 804 may convey the processed image in a Joint Photographic Experts Group (JPEG) format to the HMD 806 when performing minimal compression, rather than via an advanced video coding (AVC) compression standard such as H.264, since AVC typically is associated with significant power consumption for decoding. The UE 804 may determine whether to apply minimal compression, no compression, or some other level of compression based on the amount of high resolution data being conveyed in the processed image 814, a balance between transmission power, power consumption associated with encoding or decoding, or other factors.

After receiving the processed image 814, the HMD 806 may then synchronize and seamlessly join the low resolution-decoded, hierarchically modulated image 808 from the base station 802 with the high resolution-provided, foveated data in processed image 814 from the UE 804 to result in the final rendered image. As the HMD 806 continues to receive video frames or images from the base station 802 in a hierarchically modulated format, the HMD 806 may continue to send updated gaze information to the UE 804. Upon reception of updated gaze information, the UE 804 may process these same video frames or images according to the gaze information, for example, by decoding the low priority bits of hierarchically modulated images corresponding to the updated foveal region to obtain the high resolution data currently relevant to the HMD 806, and the UE 804 may continue to provide the processed video frames or images to the HMD 806. As the gaze information 812 may be updated and provided to the UE 804 at a high frequency or low periodicity, for example, on the order of milliseconds, to coincide with the rapid eye movement of a user wearing the HMD 806, the UE 804 may further correct the processed images it sends to the HMD 806 between video frames transmitted from the base station 802. Thus, the user of the HMD 806 may have a streamlined, video viewing experience that accounts for rapid changes in foveal direction in real time.

Referring now to FIG. 8B, rather than transmitting the hierarchically modulated image 808 in a multicast to both the HMD 806 and the UE 804, in this example the base station 802 may transmit in unicast this image to the UE 804 without transmitting the image to the HMD 806. Thus in this example, the UE 804 solely performs the video decoding and rendering on behalf of the HMD 806, rather than sharing this decoding and rendering with the HMD 806. As in the example of FIG. 8A, the UE 804 processing of the image at block 810 may be based on current gaze information 812 from the HMD 806, and thus the UE 804 may process the hierarchically modulated image 808 in this example in a similar manner. For example, the UE 804 may decode the low priority bits in the area of the hierarchically modulated image 808 corresponding to the foveal region 704 of the HMD 806. The UE 804 may further decode the high priority bits in the remaining area of the hierarchically modulated image 808 outside the foveal region 704 of the HMD 806, while refraining from decoding the low priority bits of the hierarchically modulated image 808 within these areas. The UE 804 may then transmit the processed image 814 to the HMD 806 at an optimized bit rate using the gaze information 812 received from the HMD 806. For example, the UE 804 may provide to the HMD 806 in processed image 814 the higher resolution data from the hierarchically modulated image 808 corresponding to the foveal region 704, while providing lower resolution data in the remainder of the processed image 814 outside the foveal region 704.

Moreover, if the UE 804 determines that an area outside the foveal region 704 of the HMD 806 includes high velocity updates between video frames, such as falling object 706 or other data representing a moving object or scene rather than a stationary object or scene, the UE 804 may provide this data outside the foveal region 704 to the HMD 806 at a faster frame rate (or otherwise at a higher temporal resolution) than the frame rate applied within the foveal region 704. Since the area outside the fovea 602 of the human eye is more sensitive to movement than the area inside the foveal region, providing a faster frame rate to render data in the area outside the foveal region 704 may result in a more comfortable viewing experience for the user of the HMD 806. For example, the UE 804 may include interpolated images between successive video frames provided to the HMD 806 so that the user of the HMD 806 may observe smoother object motion or smoother change in scenery in the area outside the foveal region 704.

The UE 804 may provide images to the HMD 806 using higher and lower temporal resolutions in the example of FIG. 8B, since the base station 802 in this example sends the hierarchically modulated image 808 to the UE 804 and not to the HMD 806. Thus, here the UE 804 has sole control over the frame rates that are applied to the images received at the HMD 806, in contrast to the example of FIG. 8A where the UE 804 may not be able to control the frame rate utilized by the base station 802 in sending its hierarchically modulated images 808 to the HMD 806. Nevertheless, as this area outside the foveal region 704 is still outside the user's region of interest, the UE 804 may continue to provide these updates with a lower spatial resolution than the updates within the foveal region 704. Thus, the UE 804 may apply higher and lower spatial resolutions in areas within and outside of the foveal region 704 respectively in either example FIG. 8A or 8B, while additionally applying lower and higher temporal resolutions to areas within and outside the foveal region 704 in the example of FIG. 8B. However, if the HMD 806 has the capability of managing different frame rates between the base station 802 and the UE 804, such as being able to successfully merge the UE's interpolated images between successive video frames with hierarchically modulated images 808 from the base station 802, then this concept of applying higher and lower temporal resolutions may also be applied in the example of FIG. 8A.

In either example of FIG. 8A or 8B, the gaze information 812 reported to the UE 804 may be transparent to the base station 802; that is, the base station 802 may not be able to determine the gaze information 812 of the HMD 806 since the HMD 806 does not report this information to the base station 802. This transparency may reduce complexity at the base station 802 in transmitting the hierarchically modulated image 808, since the base station 802 may transmit the image to the UE 804 irrespective of the HMD's direction of gaze. Instead, this complexity is offloaded to the UE 804 which performs split processing or rendering with the HMD 806, but the UE 804 may minimize this additional complexity through foveated rendering by processing or providing at higher resolution the portion of the image corresponding to the direction of the HMD's gaze. This mitigation of complexity may be particularly beneficial in cases where the base station 802 broadcasts or multicasts the hierarchically modulated image 808 to the UE 804 (or to multiple UEs) for rendering on multiple HMDs reporting different directions of gaze, since the base station 802 may transmit the image in a same manner regardless of the number of UEs or HMDs with minimal or no increase in complexity. Similarly, a UE receiving the broadcast or multicast, hierarchically modulated image from the base station 802 with other UEs may still be able to minimize the processing complexity that may arise from serving multiple HMDs through foveated rendering, since the UE 804 may again decode and provide at high resolution those portions of respective images corresponding to the different foveal regions associated with the various HMDs.

The joint decoding scheme of FIG. 8A allows the HMD 806 to still receive low resolution video images from the base station 802 even if the UE 804 is overloaded or otherwise unable to provide processed images 814 to the HMD 806. The mediated decoding scheme of FIG. 8B allows transmissions, processing and rendering to be applied at a single device, namely the UE 804, thereby providing sole control to the UE 804 with respect to the details of the images being rendered at the HMD 806. As a result, while the example of FIG. 8A provides more of a conservative, failsafe approach for video rendering at the HMD 806 (for example in the event the UE 804 is momentarily incapable of processing or providing processed images to the HMD 806), the example of FIG. 8B allows for more modifications or details to be seamlessly applied to a rendered image at the HMD 806.

FIG. 9 is a flowchart 900 of an example method of wireless communication. The method may be performed by a first apparatus or first device (e.g., the UE 104, 404, 804; device 204; wireless device 350), or a component of the first apparatus (e.g., split processing component 198, 298, processing unit 227, graphics processing unit 220, receiver 233, transmitter 230), which is in wireless communication with a second apparatus or second device (e.g., UE 104; HMD 402, 806) and a network entity such as a base station (e.g., base station 102/180, base station 310, 406, 802). In some implementations, the method may be performed by processing logic, including hardware, firmware, software, or a combination thereof. In some implementations, the method may be performed by a processor executing code stored in a non-transitory computer-readable medium (e.g., a memory). Optional aspects are illustrated in dashed lines. The method allows a wireless device such as a UE to support split rendering in XR using hierarchical modulation and foveated decoding and rendering to achieve reduced latency, power consumption, and processing overhead at an HMD or other client device, while leveraging the higher complexity and reception capability available at the wireless device compared to the HMD.

At block 902, the first device obtains, from a network entity, a hierarchical modulated image including higher priority bits and lower priority bits. For example, block 902 may be performed by receiver 233, 354RX, or RX processor 356. For instance, receiver 233, 354RX, or RX processor 356 of UE 804 may receive hierarchically modulated image 702, 808 from base station 802 via antennas 352, and store the hierarchically modulated image 702, 808 in GMEM 221, system memory 224, internal memory 229, or memory 360. The hierarchically modulated image may include high priority bits (such as the two most significant bits '11' corresponding to one of four center points of a given quadrant associated with QPSK modulation in FIG. 5) and low priority bits (such as the four remaining bits '0100' which correspond to one of 16 points of a given quadrant associated with 64QAM in FIG. 5). Thus, receiver 233, 354RX, or RX processor 356 may comprise a means for obtaining, from a network entity, a hierarchical modulated image including higher priority bits and lower priority bits. This function of receiver 233, 354RX, or RX processor 356 may be implemented in hardware, firmware, software, or a combination thereof.

At block 904, the first device obtains gaze information from a second device, the gaze information indicating a foveal region associated with the second device. For example, block 904 may also be performed by receiver 233, 354RX, or RX processor 356. For instance, receiver 233, 354RX, or RX processor 356 of UE 804 may receive a report including gaze information 812 from the HMD 806 via antennas 352, determine the foveal region 704 associated with the HMD from elevation, azimuth, or other data which the HMD indicated in the report, and store information identifying the foveal region 704 in GMEM 221, system memory 224, internal memory 229, or memory 360. Thus, receiver 233, 354RX, or RX processor 356 may further comprise a means for obtaining gaze information from a second device, the gaze information indicating a foveal region associated with the second device. This function of receiver 233, 354RX, or RX processor 356 may also be implemented in hardware, firmware, software, or a combination thereof.

At block 906, the first device processes a portion of the hierarchical modulated image associated with the lower priority bits using the gaze information. For example, block 904 may be performed by processor 223, processing unit 227 or graphics processing unit 220, or controller/processor 359. For instance, processor 223, processing unit 227 or graphics processing unit 220 or controller/processor 359 of UE 804 may decode or demodulate the low priority bits of the stored, hierarchically modulated image 702, 808 in the GMEM 221, system memory 224, internal memory 229, or memory 360, which low priority bits correspond to the pixels falling within the foveal region 704 that the UE 804 identified from the gaze information 812 of the HMD 806, and the UE 804 may store at least the decoded or demodulated portion of the image in (or as) processed image 814 in the GMEM 221, system memory 224, internal memory 229, or memory 360. Thus, processor 223, processing unit 227 or graphics processing unit 220 or controller/processor 359 may comprise a means for processing a portion of the hierarchical modulated image associated with the lower priority bits using the gaze information. This function of processor 223, processing unit 227 or graphics processing unit 220 or controller/processor 359 may be implemented in hardware, firmware, software, or a combination thereof.

Finally, at block 908, the first device provides an image to be rendered at the second device including the processed portion of the hierarchical modulated image. For example, block 908 may be performed by transmitter 230, 354TX, or TX processor 368. For instance, transmitter 230, 354TX, or TX processor 368 of UE 804 may encode the processed image 814 stored in the GMEM 221, system memory 224, internal memory 229, or memory 360, and transmit the processed image 814 via its antennas 352 to the HMD 806. Thus, transmitter 230, 354TX, or TX processor 368 may comprise a means for providing an image to be rendered at the second device including the processed portion of the hierarchical modulated image. This function of transmitter 230, 354TX, or TX processor 368 may be implemented in hardware, firmware, software, or a combination thereof.

In one example, the hierarchical modulated image is obtained in a multicast from the network entity to the first device and the second device, the multicast including a same hierarchical modulated image for the first device and the second device. For instance, referring to FIG. 8A, base station 802 may transmit in multicast the hierarchically modulated image 808 to UE 804 and HMD 806, and UE 804 may receive the hierarchically modulated image 808 from base station 802 in this multicast.

In one example, the processing (at block 906) includes: decoding the portion of the hierarchical modulated image associated with the lower priority bits in response to the portion being within the foveal region associated with the second device; where the image provided to the second device includes the decoded portion of the hierarchical modulated image. For instance, referring to FIG. 8A, when UE 804 processes the hierarchically modulated image 808 at block 810, UE 804 may decode the low priority bits in FIG. 5 corresponding to the higher resolution data within foveal region 704 of hierarchically modulated image 808, and the UE 804 may include this decoded, high resolution portion corresponding to foveal region 704 in processed image 814. In one example, the processed image 814 may represent a portion of the hierarchically modulated image 808 from the base station 802, for example including the high resolution details within the foveal region 704, but no details (e.g., white space) outside the foveal region 704. Alternatively, the UE 804 may provide the full image including lower resolution details (e.g., no white space) outside the foveal region 704.

In one example, the image is provided to the second device to be joined with the same hierarchical modulated image in the multicast from the network entity. For instance, referring to FIG. 8A, after the UE 804 transmits the processed image 814 to HMD 806, the HMD 806 may then synchronize and seamlessly join the low resolution-decoded, hierarchically modulated image 808 from the base station 802 with the high resolution-provided, foveated data in processed image 814 from the UE 804 to result in the final rendered image.

In one example, the decoded portion provided in the image to the second device includes a higher resolution than a resolution associated with a remainder of the image outside the foveal region. For instance, the foveal region 704 of processed image 814 may have a higher resolution than the area outside foveal region 704 in processed image 814. In another example, the decoded portion provided in the image to the second device includes a higher resolution than a resolution associated with a same portion of the same hierarchical modulated image in the multicast from the network entity. For instance, the foveal region 704 of the processed image 814 provided by UE 804 to HMD 806 may have a higher resolution (due to the UE 804 having decoded the low priority bits in hierarchically modulated image 808) than the foveal region 704 of the hierarchically modulated image 808 received at HMD 806 (due to the HMD 806 having decoded the high priority bits and not the low priority bits in hierarchically modulated image 808).

In one example, the image is provided to the second device in an uncompressed video format. For instance, the UE 804 may be wirelessly connected to the HMD 806 via a HDMI interface, and the UE 804 may convey the raw or uncompressed, processed image to the HMD 806 over the HDMI interface. Alternatively, the processed image 814 may be minimally compressed such that high frequency components are removed, quantization and entropy coding is applied, motion vectors are omitted, and the like. For example, the UE 804 may convey the processed image in a JPEG format to the HMD 806 when performing minimal compression, rather than via an AVC compression standard such as H.264, since AVC typically is associated with significant power consumption for decoding.

In one example, the hierarchical modulated image is obtained in a unicast from the network entity to the first device. For instance, referring to FIG. 8B, base station 802 may transmit in unicast the hierarchically modulated image 808 to UE 804 and not to the HMD 806, and UE 804 may receive the hierarchically modulated image 808 from base station 802 in this unicast.

In one example, the processing includes: decoding one or more portions of the hierarchical modulated image associated with the lower priority bits in response to the one or more portions being associated with: lower velocity updates occurring within the foveal region of the second device; or higher velocity updates occurring outside the foveal region of the second device; wherein the image provided to the second device includes the decoded one or more portions of the hierarchical modulated image associated with the lower priority bits and a remaining portion of the hierarchical modulated image associated with the higher priority bits. For instance, referring to FIG. 8B, when UE 804 processes the hierarchically modulated image 808 at block 810, UE 804 may decode the low priority bits in FIG. 5 corresponding to the higher resolution data within foveal region 704 of hierarchically modulated image 808, and the UE 804 may include this decoded, high resolution portion corresponding to foveal region 704 in processed image 814. For example, the UE 804 may provide to the HMD 806 in processed image 814 the higher resolution data from the hierarchically modulated image 808 corresponding to the foveal region 704, while providing lower resolution data in the remainder of the processed image 814 outside the foveal region 704. Moreover, if the UE 804 determines that an area outside the foveal region 704 of the HMD 806 includes high velocity updates between video frames, such as falling object 706 or other data representing a moving object or scene rather than a stationary object or scene, the UE 804 may provide this data outside the foveal region 704 to the HMD 806 at a faster frame rate (or otherwise at a higher temporal resolution) than the frame rate applied within the foveal region 704. For example, the UE 804 may include interpolated images between successive video frames provided to the HMD 806 so that the user of the HMD 806 may observe smoother object motion or smoother change in scenery in the area outside the foveal region 704.

In one example, the decoded one or more portions associated with the lower velocity updates are provided in the image to the second device with a higher resolution than a resolution associated with a remainder of the image outside the foveal region. For instance, the foveal region 704 of processed image 814 may have a higher spatial resolution but a lower temporal resolution (slower frame rate due to having lower velocity updates) than the area outside foveal region 704 in processed image 814. In another example, the decoded one or more portions associated with the higher velocity updates are provided in the image to the second device using a faster frame rate than a frame rate used for a remainder of the image within the foveal region. For instance, the area outside foveal region 704 of processed image 814 corresponding to falling object 706 may have a higher temporal resolution (faster frame rate due to having higher velocity updates) but a lower spatial resolution than the area inside foveal region 704 in processed image 814.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Clause 1. A method of wireless communication at a first device, comprising: obtaining, from a network entity, a hierarchical modulated image including higher priority bits and lower priority bits; obtaining gaze information from a second device, the gaze information indicating a foveal region associated with the second device; processing a portion of the hierarchical modulated image associated with the lower priority bits using the gaze information; and providing an image to be rendered at the second device including the processed portion of the hierarchical modulated image.

Clause 2. The method of clause 1, wherein the hierarchical modulated image is obtained in a multicast from the network entity to the first device and the second device, the multicast including a same hierarchical modulated image for the first device and the second device.

Clause 3. The method of clause 2, wherein the processing comprises: decoding the portion of the hierarchical modulated image associated with the lower priority bits in response to the portion being within the foveal region associated with the second device; wherein the image provided to the second device includes the decoded portion of the hierarchical modulated image.

Clause 4. The method of clause 3, wherein the image is provided to the second device to be joined with the same hierarchical modulated image in the multicast from the network entity.

Clause 5. The method of clause 3 or clause 4, wherein the decoded portion provided in the image to the second device includes a higher resolution than a resolution associated with a remainder of the image outside the foveal region.

Clause 6. The method of any of clauses 3 to 5, wherein the decoded portion provided in the image to the second device includes a higher resolution than a resolution associated with a same portion of the same hierarchical modulated image in the multicast from the network entity.

Clause 7. The method of any of clauses 2 to 6, wherein the image is provided to the second device in an uncompressed video format.

Clause 8. The method of clause 1, wherein the hierarchical modulated image is obtained in a unicast from the network entity to the first device.

Clause 9. The method of clause 8, wherein the processing comprises: decoding one or more portions of the hierarchical modulated image associated with the lower priority bits in response to the one or more portions being associated with: lower velocity updates occurring within the foveal region of the second device; or higher velocity updates occurring outside the foveal region of the second device; wherein the image provided to the second device includes the decoded one or more portions of the hierarchical modulated image associated with the lower priority bits and a remaining portion of the hierarchical modulated image associated with the higher priority bits.

Clause 10. The method of clause 9, wherein the decoded one or more portions associated with the lower velocity updates are provided in the image to the second device with a higher resolution than a resolution associated with a remainder of the image outside the foveal region.

Clause 11. The method of clause 9 or clause 10, wherein the decoded one or more portions associated with the higher velocity updates are provided in the image to the second device using a faster frame rate than a frame rate used for a remainder of the image within the foveal region.

Clause 12. A first apparatus for wireless communication, comprising: a processor; memory coupled with the processor; and instructions stored in the memory and operable, when executed by the processor, to cause the first apparatus to: obtain, from a network entity, a hierarchical modulated image including higher priority bits and lower priority bits; obtain gaze information from a second apparatus, the gaze information indicating a foveal region associated with the second apparatus; process a portion of the hierarchical modulated image associated with the lower priority bits using the gaze information; and provide an image to be rendered at the second apparatus including the processed portion of the hierarchical modulated image.

Clause 13. The first apparatus of clause 12, wherein the instructions, when executed by the processor, cause the first apparatus to obtain the hierarchical modulated image in a multicast from the network entity to the first apparatus and the second apparatus, the multicast including a same hierarchical modulated image for the first apparatus and the second apparatus.

Clause 14. The first apparatus of clause 13, wherein to process the portion of the hierarchical modulated image associated with the lower priority bits using the gaze information, the instructions, when executed by the processor, cause the first apparatus to: decode the portion of the hierarchical modulated image associated with the lower priority bits in response to the portion being within the foveal region associated with the second apparatus; wherein the image provided to the second apparatus includes the decoded portion of the hierarchical modulated image.

Clause 15. The first apparatus of clause 14, wherein the instructions, when executed by the processor, cause the first apparatus to provide the image to the second apparatus to be joined with the same hierarchical modulated image in the multicast from the network entity.

Clause 16. The first apparatus of clause 14 or clause 15, wherein the decoded portion provided in the image to the second apparatus includes a higher resolution than: a resolution associated with a remainder of the image outside the foveal region, and a resolution associated with a same portion of the same hierarchical modulated image in the multicast from the network entity.

Clause 17. The first apparatus of any of clauses 13 to 16, wherein the image is provided to the second apparatus in an uncompressed video format.

Clause 18. The first apparatus of clause 12, wherein the instructions, when executed by the processor, cause the first apparatus to obtain the hierarchical modulated image in a unicast from the network entity to the first apparatus.

Clause 19. The first apparatus of clause 18, wherein to process the portion of the hierarchical modulated image associated with the lower priority bits using the gaze information, the instructions, when executed by the processor, cause the first apparatus to: decode one or more portions of the hierarchical modulated image associated with the lower priority bits in response to the one or more portions being associated with: lower velocity updates occurring within the foveal region of the second apparatus; or higher velocity updates occurring outside the foveal region of the second apparatus; wherein the image provided to the second apparatus includes the decoded one or more portions of the hierarchical modulated image associated with the lower priority bits and a remaining portion of the hierarchical modulated image associated with the higher priority bits.

Clause 20. A first apparatus for wireless communication, comprising: means for obtaining, from a network entity, a hierarchical modulated image including higher priority bits and lower priority bits, the means for obtaining being further configured to obtain gaze information from a second apparatus, the gaze information indicating a foveal region associated with the second apparatus; means for processing a portion of the hierarchical modulated image associated with the lower priority bits using the gaze information; and means for providing an image to be rendered at the second apparatus including the processed portion of the hierarchical modulated image.

What is claimed is:

1. A method of wireless communication at a first device, comprising:
obtaining, from a network entity, a hierarchical modulated image including higher priority bits and lower priority bits;
obtaining gaze information from a second device, the gaze information indicating a foveal region associated with the second device;
processing a portion of the hierarchical modulated image associated with the lower priority bits using the gaze information; and
providing an image to be rendered at the second device including the processed portion of the hierarchical modulated image.

2. The method of claim 1, wherein the hierarchical modulated image is obtained in a multicast from the network entity to the first device and the second device, the multicast including a same hierarchical modulated image for the first device and the second device.

3. The method of claim 2, wherein the processing comprises:
decoding the portion of the hierarchical modulated image associated with the lower priority bits in response to the portion being within the foveal region associated with the second device;
wherein the image provided to the second device includes the decoded portion of the hierarchical modulated image.

4. The method of claim 3, wherein the image is provided to the second device to be joined with the same hierarchical modulated image in the multicast from the network entity.

5. The method of claim 3, wherein the decoded portion provided in the image to the second device includes a higher resolution than a resolution associated with a remainder of the image outside the foveal region.

6. The method of claim 3, wherein the decoded portion provided in the image to the second device includes a higher resolution than a resolution associated with a same portion of the same hierarchical modulated image in the multicast from the network entity.

7. The method of claim 2, wherein the image is provided to the second device in an uncompressed video format.

8. The method of claim 1, wherein the hierarchical modulated image is obtained in a unicast from the network entity to the first device.

9. The method of claim 8, wherein the processing comprises:
decoding one or more portions of the hierarchical modulated image associated with the lower priority bits in response to the one or more portions being associated with:
lower velocity updates occurring within the foveal region of the second device; or
higher velocity updates occurring outside the foveal region of the second device;
wherein the image provided to the second device includes the decoded one or more portions of the hierarchical modulated image associated with the lower priority bits and a remaining portion of the hierarchical modulated image associated with the higher priority bits.

10. The method of claim 9, wherein the decoded one or more portions associated with the lower velocity updates are provided in the image to the second device with a higher resolution than a resolution associated with a remainder of the image outside the foveal region.

11. The method of claim 9, wherein the decoded one or more portions associated with the higher velocity updates are provided in the image to the second device using a faster frame rate than a frame rate used for a remainder of the image within the foveal region.

12. A first apparatus for wireless communication, comprising:
a processor;
memory coupled with the processor; and
instructions stored in the memory and operable, when executed by the processor, to cause the first apparatus to:
obtain, from a network entity, a hierarchical modulated image including higher priority bits and lower priority bits;
obtain gaze information from a second apparatus, the gaze information indicating a foveal region associated with the second apparatus;
process a portion of the hierarchical modulated image associated with the lower priority bits using the gaze information; and
provide an image to be rendered at the second apparatus including the processed portion of the hierarchical modulated image.

13. The first apparatus of claim 12, wherein the instructions, when executed by the processor, cause the first apparatus to obtain the hierarchical modulated image in a multicast from the network entity to the first apparatus and the second apparatus, the multicast including a same hierarchical modulated image for the first apparatus and the second apparatus.

14. The first apparatus of claim 13, wherein to process the portion of the hierarchical modulated image associated with the lower priority bits using the gaze information, the instructions, when executed by the processor, cause the first apparatus to:
decode the portion of the hierarchical modulated image associated with the lower priority bits in response to the portion being within the foveal region associated with the second apparatus;
wherein the image provided to the second apparatus includes the decoded portion of the hierarchical modulated image.

15. The first apparatus of claim 14, wherein the instructions, when executed by the processor, cause the first apparatus to provide the image to the second apparatus to be joined with the same hierarchical modulated image in the multicast from the network entity.

16. The first apparatus of claim 14, wherein the decoded portion provided in the image to the second apparatus includes a higher resolution than:
a resolution associated with a remainder of the image outside the foveal region, and
a resolution associated with a same portion of the same hierarchical modulated image in the multicast from the network entity.

17. The first apparatus of claim 13, wherein the image is provided to the second apparatus in an uncompressed video format.

18. The first apparatus of claim 12, wherein the instructions, when executed by the processor, cause the first apparatus to obtain the hierarchical modulated image in a unicast from the network entity to the first apparatus.

19. The first apparatus of claim 18, wherein to process the portion of the hierarchical modulated image associated with the lower priority bits using the gaze information, the instructions, when executed by the processor, cause the first apparatus to:
- decode one or more portions of the hierarchical modulated image associated with the lower priority bits in response to the one or more portions being associated with:
  - lower velocity updates occurring within the foveal region of the second apparatus; or
  - higher velocity updates occurring outside the foveal region of the second apparatus;
- wherein the image provided to the second apparatus includes the decoded one or more portions of the hierarchical modulated image associated with the lower priority bits and a remaining portion of the hierarchical modulated image associated with the higher priority bits.

20. A first apparatus for wireless communication, comprising:
- means for obtaining, from a network entity, a hierarchical modulated image including higher priority bits and lower priority bits, the means for obtaining being further configured to obtain gaze information from a second apparatus, the gaze information indicating a foveal region associated with the second apparatus;
- means for processing a portion of the hierarchical modulated image associated with the lower priority bits using the gaze information; and
- means for providing an image to be rendered at the second apparatus including the processed portion of the hierarchical modulated image.

* * * * *